United States Patent
Ueda

(10) Patent No.: US 10,228,675 B2
(45) Date of Patent: Mar. 12, 2019

(54) CONTROLLING ONE OR MORE DEVICES UPON DETECTING ABNORMAL BEHAVIOR

(71) Applicant: OMRON Corporation, Kyoto-shi, Kyoto (JP)

(72) Inventor: Takamasa Ueda, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 184 days.

(21) Appl. No.: 15/122,941

(22) PCT Filed: Jan. 14, 2015

(86) PCT No.: PCT/JP2015/050827
§ 371 (c)(1),
(2) Date: Sep. 1, 2016

(87) PCT Pub. No.: WO2015/136961
PCT Pub. Date: Sep. 17, 2015

(65) Prior Publication Data
US 2017/0075336 A1   Mar. 16, 2017

(30) Foreign Application Priority Data
Mar. 14, 2014 (JP) ................ 2014-052624

(51) Int. Cl.
G05B 19/05 (2006.01)
G05B 23/02 (2006.01)
G05B 19/418 (2006.01)

(52) U.S. Cl.
CPC ....... *G05B 19/058* (2013.01); *G05B 19/4184* (2013.01); *G05B 23/0264* (2013.01);
(Continued)

(58) Field of Classification Search
CPC .................................................. G05B 19/058
(Continued)

(56) References Cited

U.S. PATENT DOCUMENTS 5,241,482 A * 8/1993 Iida .................... G05B 19/4184
340/3.32
5,673,194 A * 9/1997 Cipelletti ........... G05B 19/4183
700/115

(Continued)

FOREIGN PATENT DOCUMENTS

CN   1420661 A   5/2003
CN   101833298 A   9/2010

(Continued)

OTHER PUBLICATIONS

Malamas, Elias N., et al. "A survey on industrial vision systems, applications and tools." Image and vision computing 21.2 (2003): pp. 171-188.*

(Continued)

*Primary Examiner* — Satish Rampuria
(74) *Attorney, Agent, or Firm* — Metrolexis Law Group, PLLC

(57) ABSTRACT

At least some of plural control target devices are classified so as to belong to one of plural groups. A control device holds identification information specifying a belonging control target device and information about a behavior of a remaining control target device in detecting an abnormality of a control target device belonging to an identical group with respect to each group. The control device detects the abnormality of each of the plural control target devices based on data exchanged with the plural control target devices in executing a user program. When the abnormality is detected in one of the plural control target devices, the control device refers to the identification information to specify an abnormal group to which the control target device in which the abnormality is detected belongs, and the control device refers to the information about the behavior to control action of the abnormal group.

7 Claims, 11 Drawing Sheets

(52) U.S. Cl.
CPC ..... *G05B 23/0267* (2013.01); *G05B 23/0286* (2013.01); *G05B 2219/24033* (2013.01); *Y02P 90/265* (2015.11)

(58) Field of Classification Search
USPC .................................................. 700/275–306
See application file for complete search history.

(56) References Cited

U.S. PATENT DOCUMENTS

| | | | |
|---|---|---|---|
| 7,536,595 B1 * | 5/2009 | Hiltunen | G06F 11/0709 714/26 |
| 8,628,331 B1 * | 1/2014 | Wright | G09B 19/00 434/107 |
| 2010/0235682 A1 | 9/2010 | Yoshida et al. | |
| 2012/0143383 A1 * | 6/2012 | Cooperrider | H04Q 9/00 700/295 |
| 2014/0005838 A1 | 1/2014 | Ogura | |
| 2014/0012402 A1 | 1/2014 | Nishiyama et al. | |
| 2017/0075336 A1 | 3/2017 | Ueda | |

FOREIGN PATENT DOCUMENTS

| | | |
|---|---|---|
| CN | 103403633 A | 11/2013 |
| EP | 1638054 A1 | 3/2006 |
| JP | 2000-293210 A | 10/2000 |
| JP | 2004-30345 A | 1/2004 |
| JP | 2013-117804 A | 6/2013 |
| WO | 2012123989 A1 | 9/2012 |
| WO | 2012124145 A1 | 9/2012 |
| WO | 2015136961 A1 | 9/2015 |

OTHER PUBLICATIONS

Koren, Yoram, et al. "Reconfigurable manufacturing systems." CIRP annals 48.2 (1999): pp. 527-540.*
Trentesaux, Damien. "Distributed control of production systems." Engineering Applications of Artificial Intelligence 22.7 (2009): pp. 971-978.*
The Chinese Office Action (CNOA) dated Feb. 28, 2018 in a counterpart Chinese patent application. Application#201580011583.0.
The Japanese Office Action dated Feb. 13, 2018 in a counterpart Japanese Patent application Application# 2014052624 number.
The Japanese Office Action dated Oct. 17, 2017 in a counterpart Japanese application. Application# 2014052624.

* cited by examiner

FIG. 7

| Behavior | Abnormal device | Remaining device of abnormal group | Restoration condition |
|---|---|---|---|
| Operation stop | Operation stop | Operation stop | Restoration by explicit abnormality cancelation after removal of abnormal factor |
| Shrinking operation | Operation stop | Operation continuation | Restoration by explicit abnormality cancelation after removal of abnormal factor |
| Continuation operation | Operation stop | Operation continuation | Automatic restoration by removal of abnormal factor |

FIG. 8

| Group name | Behavior |
|---|---|
| Group1 | Fail-soft operation (shrinking operation) |
| Group2 | Stop (operation stop) |
| Group3 | Continuous operation (continuation operation) |
| ⋮ | ⋮ |

FIG. 9

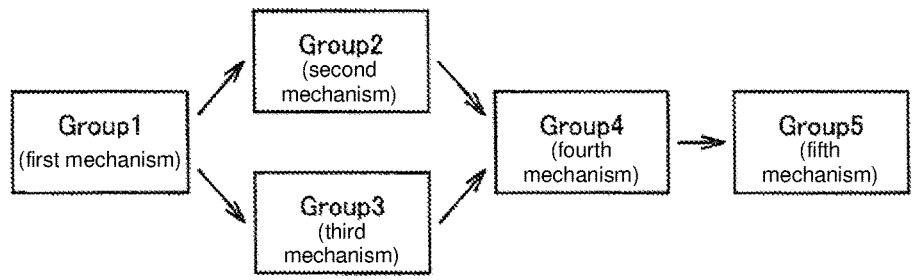

FIG. 10

| Master \ Slave | Group1 | Group2 | Group3 | Group4 | |
|---|---|---|---|---|---|
| Group1 | | Independence | Independence | Independence | |
| Group2 | Dependence | | Independence | Independence | ... |
| Group3 | Dependence | Dependence | | Independence | |
| Group4 | Dependence | Dependence | Dependence | | |
| ⋮ | | | | | |

| Group name | Group dependence information |
|---|---|
| Group1 | None |
| Group2 | Group1 |
| Group3 | Group1, Group2 |
| ⋮ | ⋮ |

CONTROLLING ONE OR MORE DEVICES UPON DETECTING ABNORMAL BEHAVIOR

TECHNICAL FIELD

The present invention relates to a control device that controls actions of plural control target devices by conducting data communication with the plural control target devices.

BACKGROUND ART

Typically, a control system mainly constructed with a control device such as a programmable logic controller (hereinafter also abbreviated to "PLC") controls machines and facilities used in many production sites. Typically, a user operates an information processing device, called a support device, to design and produce a control program executed in the control device. The program that is freely designed and produced by the user is also referred to as a user program. Patent Document 1 discloses an example of a function provided with the support device.

Japanese Unexamined Patent Publication No. 2013-117804 (Patent Document 1) discloses a technology of converting an interlock circuit described in a ladder program used in the PLC into a comma separated values (CSV) file in order to display an operation monitoring interlock circuit. In the technology of Patent Document 1, an input element is extracted from a text-format program of the interlock circuit, pieces of information such as a comment, a variable name, a contact type, and a display position on the interlock screen are specified in each input element, and the screen displaying CSV file constructed with the pieces of information is produced.

PRIOR ART DOCUMENT

Patent Document

Patent Document 1: Japanese Unexamined Patent Publication No. 2013-117804

SUMMARY OF THE INVENTION

Problems to be Solved by the Invention

In the technology of Patent Document 1, for example, a value input to and/or output from an input/output (IO) unit can be defined by a variable. The use of the variable can easily produce the ladder program of the interlock circuit.

However, when the number of processes or the number of mechanisms used in each process increases with speed enhancement and expansion in scale of production facility, the number of control target devices (a device such as an IO unit) that exchange data with the PLC becomes large. Therefore, the number of variables used in the PLC increases markedly, and a degree of difficulty of user program design is significantly enhanced for a user (such as a developer).

In the case that a new device is added or a network configuration is changed after the user program is produced, the already-produced user program is reviewed to generate necessity to change a corresponding portion. Therefore, there is a problem in that a large amount of man-hour is expended to modify the user program.

Even if some of the target processes or mechanisms are common to plural control systems, a common portion is hard to be extracted from the user program used with the large number of variables, which results in a problem in that design work efficiency of the user program is hard to be achieved.

Because the large number of devices are centrally managed in the PLC, which device constitutes the mechanism of the process is hard to be specified. Therefore, there is a problem in that a fail-safe function or an interlock function is hard to be implemented in the case that the abnormality occurs in one of the devices.

An object of the present invention is to achieve simplification of development of the control device even if the number of control target devices increases in the control device that exchanges data with plural control target devices.

Means for Solving the Problem

According to one aspect of the present invention, a control device that controls operations of plural control target devices by exchanging data with the plural control target devices, each of at least some of the plural control target devices are classified so as to belong to one of plural groups. The control device includes: a section configured to hold identification information specifying a belonging control target device and information about a behavior of a remaining control target device in detecting an abnormality of a control target device belonging to an identical group with respect to each of the plural groups; a section configured to detect the abnormality of each of the plural control target devices based on data exchanged with the plural control target devices in executing a user program associated with operations of the plural control target devices; a section configured to refer to, when the abnormality is detected in one of the plural control target devices, the identification information to specify an abnormal group, the abnormal group being a group to which the control target device in which the abnormality is detected belongs; and a section configured to refer to the information about the behavior to control action of the abnormal group.

Preferably the section that controls the action of the abnormal group selects one of a first action of stopping all the control target devices belonging to the abnormal group, a second action of stopping the operation of control target device in which the abnormality is detected, and of continuing the operation of the remaining control target device until a predetermined abnormality canceling condition is established in the control device after an abnormal factor is removed, and a third action of temporarily stopping the operation of the control target device, in which the abnormality is detected, until the abnormal factor is removed, and of continuing the operation of the remaining control target device.

Preferably the control device further includes: a section configured to hold information about a dependence relationship controlling action of own group according to action of another group with respect to each of the plural groups; and a section configured to control action of the remaining control group except for the abnormal group according to the action of the abnormal group by referring to the information about the dependence relationship.

Preferably the control device further includes a section configured to control action of the remaining control group except for the abnormal group according to the action of the abnormal group by executing the user program. At this point, the user program is configured to be able to program a dependence relationship controlling action of own group according to action of another group with respect to each of the plural groups.

Preferably the section configured to control the action of the remaining control group selects stop or continuation of the operation with respect to each remaining control group when the operation of the abnormal group stops.

Preferably the control device further includes a section configured to allocate the plural groups to plural tasks including the user program.

Preferably the control device further includes a section configured to control timing of inputting and outputting the signal in each of the plural control target devices in units of groups.

Effect of the Invention

Accordingly, in the present invention, the development of the control device can be simplified even if the number of control target devices increases in the control device that exchanges data with plural control target devices.

BRIEF DESCRIPTION OF THE DRAWINGS

FIG. 7 is a view illustrating the group behavior information set to the support device of the embodiment.

FIG. 8 is a schematic diagram illustrating the group behavior information set to the support device of the embodiment.

FIG. 9 is a view illustrating group dependence information set to the support device of the embodiment.

FIG. 10 is a view illustrating the group dependence information set to the support device of the embodiment.

MODE FOR CARRYING OUT THE INVENTION

Figure 1:
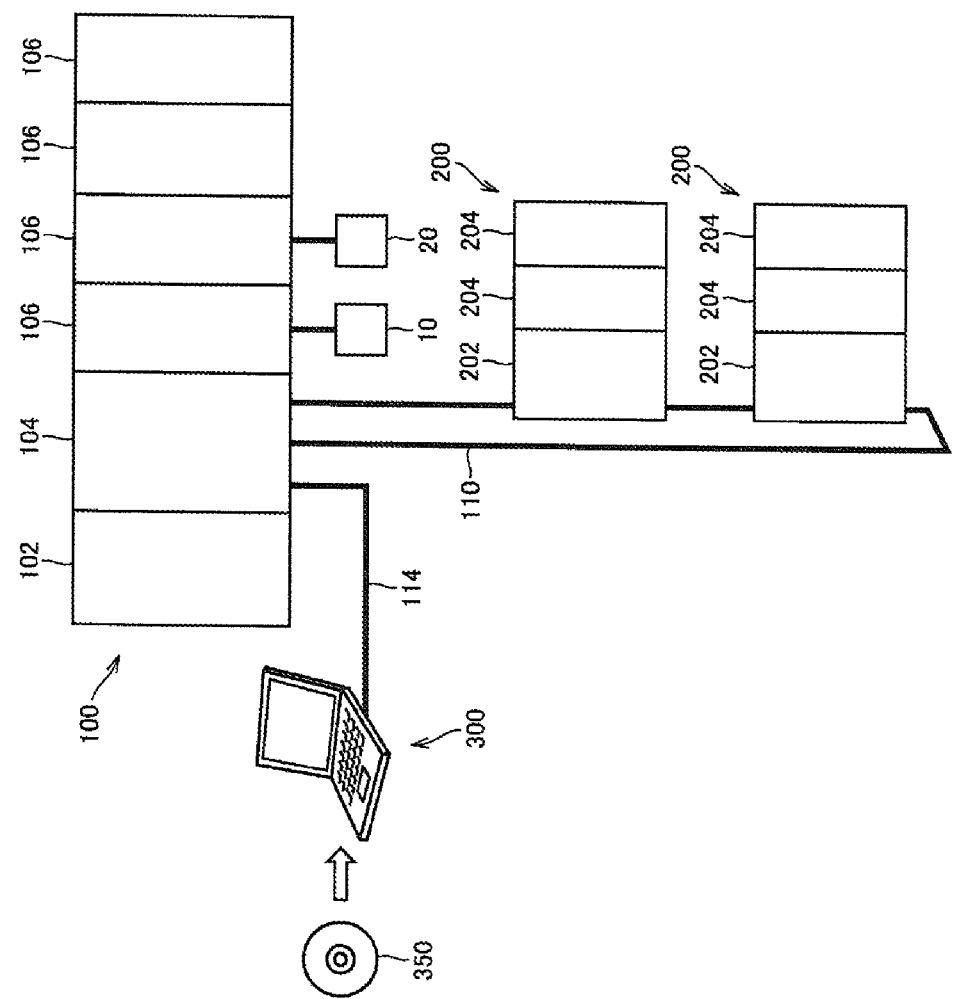
FIG. 1 is a schematic diagram illustrating a system configuration of a control system according to an embodiment.

Hereinafter, an exemplary embodiment of the present invention will be described in detail with reference to the drawings. In the drawings, the identical or equivalent component is designated by the identical symbol, and the overlapping description is omitted.

<A. System Configuration>

A system configuration of a control system according to an embodiment will be described below. In the embodiment, a programmable logic controller (PLC) that controls control targets such as a machine and a facility will be described as a typical example of the control device. However, the control device of the present invention can be used in not only the PLC but also various control devices.

FIG. 1 is a schematic diagram illustrating a system configuration of a control system 1 of the embodiment. Referring to FIG. 1, the control system 1 includes a PLC 100 and a support device 300 connected to the PLC 100. The PLC 100 executes a user program produced with the support device 300 in a periodic or event manner. The support device 300 is a typical example of the information processing device that produces the user program executed in the PLC 100.

The support device 300 can be connected to the PLC 100 through a connection cable 114. As described later, the support device 300 provides functions of producing the user program, transferring the user program to the PLC 100, setting various parameters, performing monitoring, and performing debugging. The PLC 100 and the support device 300 can conduct communication with each other in pursuant to, typically, a universal serial bus (USB) standard.

The PLC 100 includes a CPU unit 104 that performs control calculation and at least one function unit 106. Each of the function units typically includes an IO unit, a communication unit, and a servo unit, and the function units can exchange data with each other through a PLC system bus (not illustrated). A power supply unit 102 supplies electric power having a proper voltage to the function units.

In the control system 1, the PLC 100 exchanges data with various field devices through the function unit 106 and/or a field bus 110. Examples of the field devices include an actuator that performs some sort of processing on a control target and a sensor that acquires various pieces of information from the control target. FIG. 1 illustrates a detection switch 10 and a relay 20 as examples of the field devices. The PLC 100 is also connected to at least one remote IO device 200 through the field bus 110. Basically, the remote IO device 200 performs processing associated with general input and output processing similarly to the function unit 106.

Any kind of bus scheme can be adopted as the field bus 110. For example, various kinds of industrial Ethernet (registered trademark) can be used as the field bus 110. Examples of industrial Ethernet (registered trademark) include EtherCAT (registered trademark), PROFINET IRT, MECHATROLINK (registered trademark)-III, Powerlink, SERCOS (registered trademark)-III, and CIP Motion. A field network except for industrial Ethernet (registered trademark) may be adopted. For example, DeviceNet or CompoNet (registered trademark) may be adopted.

The remote IO device 200 is a typical example of the plural remote devices connected to the PLC 100 through the field bus 110. The PLC 100 exchanges the data with the remote IO devices 200.

More specifically, the remote IO device 200 includes a communication coupler 202 that performs processing associated with data transfer through the field bus 110 and at least one function unit 204. The function units can exchange data with each other through a remote IO device bus (not illustrated). That is, the PLC 100 includes a communication master function of conducting bus communication with the remote IO device 200. The remote IO device 200 includes a bus communication function with respect to the communication master function of the PLC, namely, a communication slave function controlled according to the PLC.

<B. Configuration of PLC 100>

Figure 2:
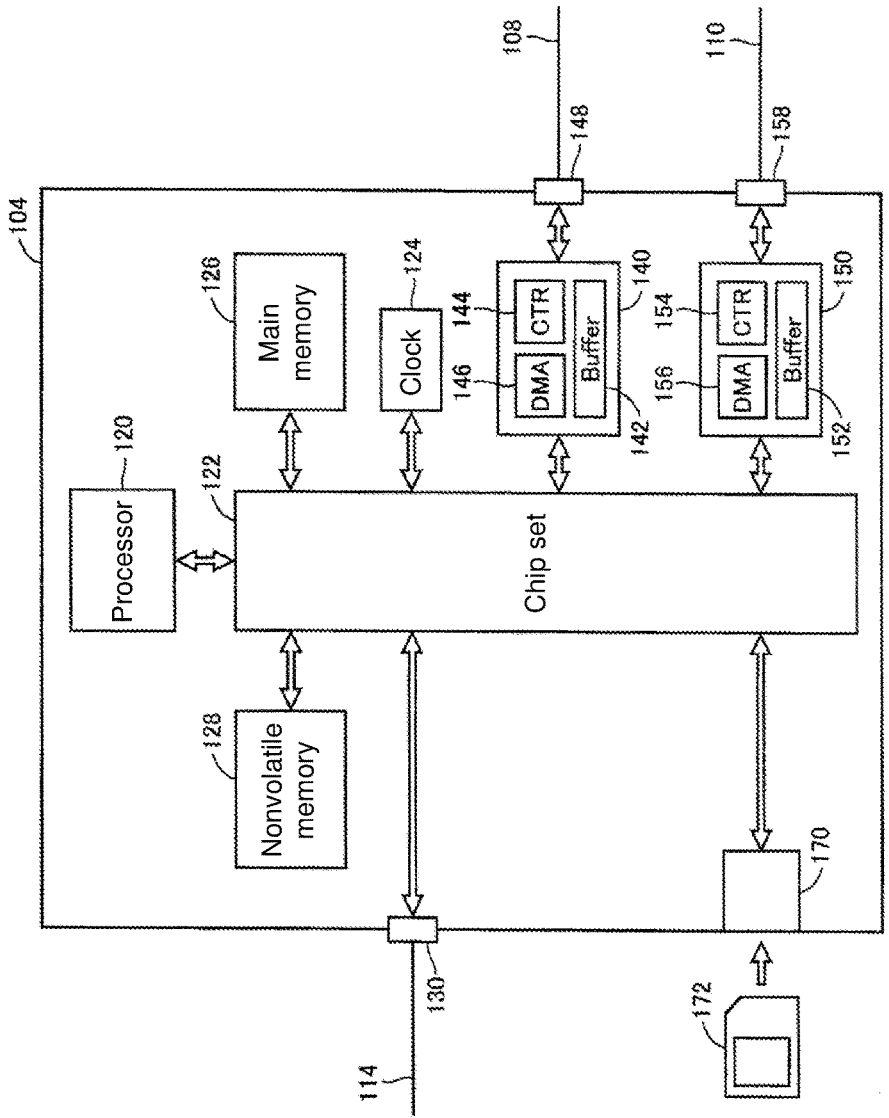
FIG. 2 is a schematic diagram illustrating a hardware configuration of a main portion of a PLC of the embodiment.
Figure 3:
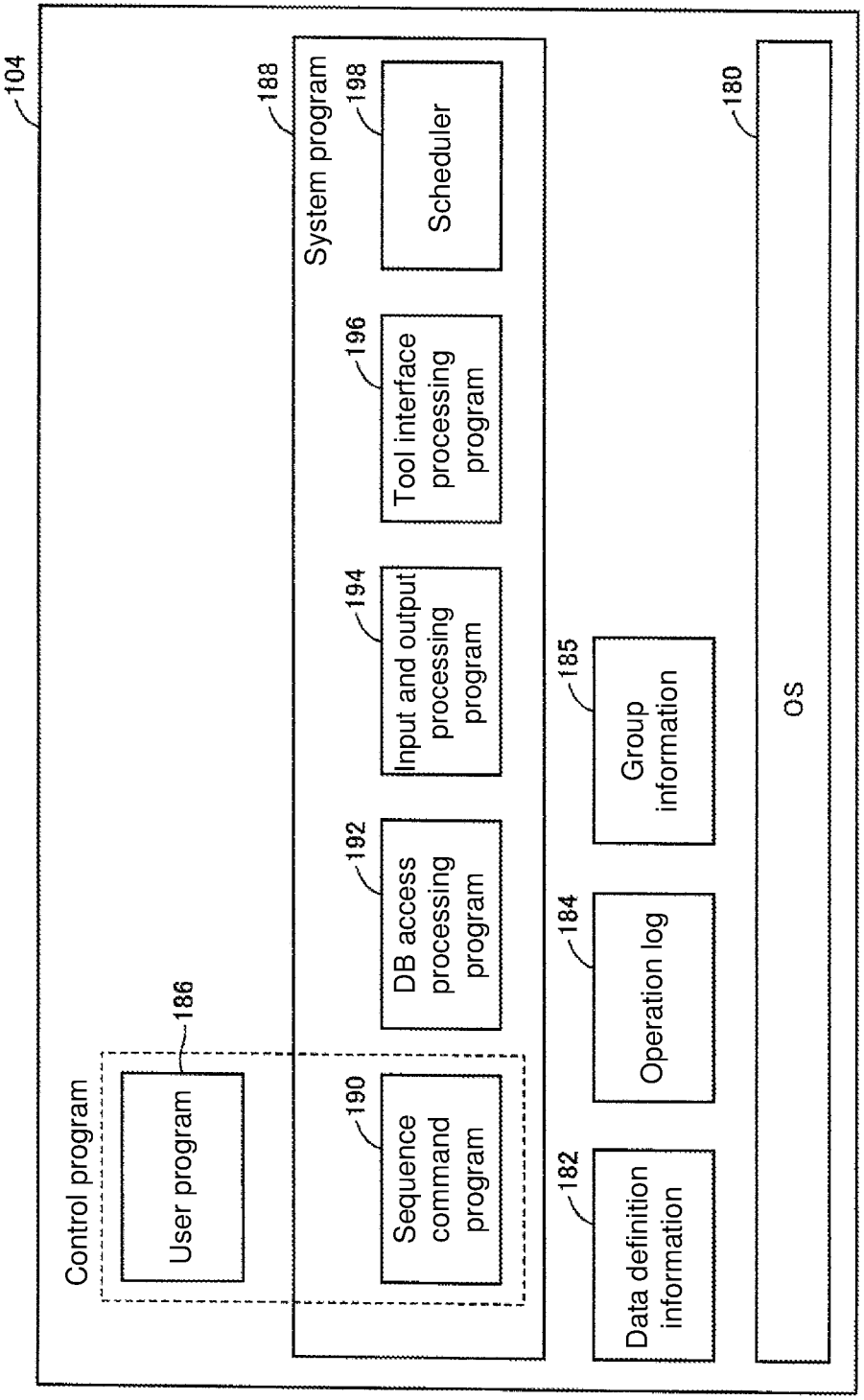
FIG. 3 is a schematic diagram illustrating a software configuration of the PLC of the embodiment.

A configuration of the PLC 100 will be described below. FIG. 2 is a schematic diagram illustrating a hardware configuration of a main portion of the PLC 100. FIG. 3 is a schematic diagram illustrating a software configuration of the PLC 100.

The hardware configuration of the CPU unit 104 of the PLC 100 will be described with reference to FIG. 2. The CPU unit 104 includes a processor 120, a chip set 122, a system clock 124, a main memory 126, a nonvolatile memory 128, a USB connector 130, a PLC system bus controller 140, a field bus controller 150, and a memory card interface 170. The chip set 122 and other components are connected to one another through various buses.

Typically, the processor 120 and the chip set 122 are configured according to a general-purpose computer architecture. That is, the processor 120 interprets and performs a command code sequentially supplied from the chip set 122 according to an internal clock. The chip set 122 transmits and receives internal data to and from various connected components, and generates the command code necessary for the processor 120. The system clock 124 generates a system clock having a predetermined period, and provides the system clock to the processor 120. The chip set 122 has a function of caching data obtained through calculation processing performed by the processor 120.

The CPU unit 104 includes the main memory 126 and the non-volatile memory 128 as the storage unit. The main memory 126 is a volatile storage area, retains various programs that should be executed with the processor 120, and is also used as a work memory during the execution of various programs. An operating system (OS), a system program, the user program, data definition information, log information, and group information (to be described later) are stored in the nonvolatile memory 128 in a nonvolatile manner.

The USB connector 130 is an interface that connects the support device 300 and the CPU unit 104 to each other. Typically, an executable program transferred from the support device 300 is captured in the CPU unit 104 through the USB connector 130.

The CPU unit 104 includes the PLC system bus controller 140, the field bus controller 150, and the higher-level communication controller 160 as the communication unit. These communication units transmit and receive data.

The PLC system bus controller 140 controls the transmission and reception of the data through a PLC system bus 108. More specifically, the PLC system bus controller 140 includes a buffer memory 142, a PLC system bus control circuit 144, and a direct memory access (DMA) control circuit 146. The PLC system bus controller 140 is connected to the PLC system bus 108 through a PLC system bus connector 148.

The field bus controller 150 includes a buffer memory 152, a field bus control circuit 154, and a DMA control circuit 156. The field bus controller 150 is connected to the field bus 110 through a field bus connector 158.

The memory card interface 170 connects the processor 120 and a memory card 172 that can detachably be attached to the CPU unit 104.

A software configuration that implements various functions provided by the PLC 100 will be described below with reference to FIG. 3. Command codes included in the software are read in proper timing, and executed with the processor 120 of the CPU unit 104.

Referring to FIG. 3, the software executed with the CPU unit 104 is constructed with three levels of an OS 180, a system program 188, and a user program 186.

The OS 180 provides a basic execution environment in order that the processor 120 executes the system program 188 and the user program 186.

The system program 188 is a software group that provides a basic function as the PLC 100. Specifically, the system program 188 includes a sequence command program 190, a database (DB) access processing program 192, an input and output processing program 194, a Tool interface processing program 196, and a scheduler 198. On the other hand, the user program 186 is one that is arbitrarily produced according to a control purpose of the control target.

The user program 186 achieves the control purpose in conjunction with the sequence command program 190. That is, the user program 186 performs programmed action using a command, a function, and a functional module, which are provided by the sequence command program 190.

Data definition information 182 includes a definition in order to deal with data (input data, output data, and internal data) referred to in executing the user program 186 as a unique variable. When a predetermined event occurs in association with the execution of the system program 188 and the user program 186, information about the occurred event is stored in an operation log 184 while associated with clock time information. Therefore, occurrence order of the events can be specified together with an event source.

Group information 185 is information that controls a group as one control unit by grouping plural devices used in the control system 1. The group information 185 will be described in detail later.

Each program will be described in detail below.

The sequence command program 190 includes a command code group that implements a content of a sequence command by calling an entity of the sequence command assigned in the user program 186 in association with the execution of the user program 186.

The DB access processing program 192 includes a command code group that implements processing necessary for access to a database device in association with the execution of the user program 186.

The input and output processing program 194 is a program that manages acquisition of the input data and transmission of the output data between the function unit 106 and various field devices.

The Tool interface processing program 196 provides an interface that exchanges data with the support device 300.

The scheduler 198 produces a thread or a procedure according to a predetermined priority or a value of a system timer in order to execute the control program.

As described above, the user program 186 is produced according to the control purpose (for example, target line or process) of the user. Typically, the user program 186 is formed into an object program form that is executable with the processor 120 of the CPU unit 104. A source program described in a ladder form, a function block form, or IEC 61131-3 of a PLC program language is compiled in the support device 300 or the like, thereby producing the user program 186. IEC 61131-3 is five kinds of program languages including a ladder diagram (LD), a sequential function chart (SFC), a function block diagram (FBD), a structured text (ST), and an instruction list (IL). The produced user program having the object program form is transferred from the support device 300 to the CPU unit 104, and stored in the nonvolatile memory 128.

<C. Configuration of Remote IO Device 200>

A configuration of the remote IO device 200 of the embodiment will be described below. The remote IO device 200 includes a hardware configuration similar to that of the PLC 100 in FIG. 2. However, it is not necessary for the remote IO device 200 to execute the user program. Therefore, such a part as the processor 120 that performs calculation processing can be simplified.

The remote IO device 200 includes the communication coupler 202 and at least one function unit 204 connected to the communication coupler 202 through an internal bus (the remote IO device bus (not illustrated)). Because the function unit 204 is similar to the function unit 106 connected to the CPU unit 104, the detailed description is not repeated.

<D. Configuration of Support Device 300>

The support device 300 of the embodiment will be described below. The support device 300 assists the use of the CPU unit 104 of the PLC 100, and provides functions of setting various parameters, performing programming, performing the monitoring, and performing the debugging to the PLC 100.

Figure 4:
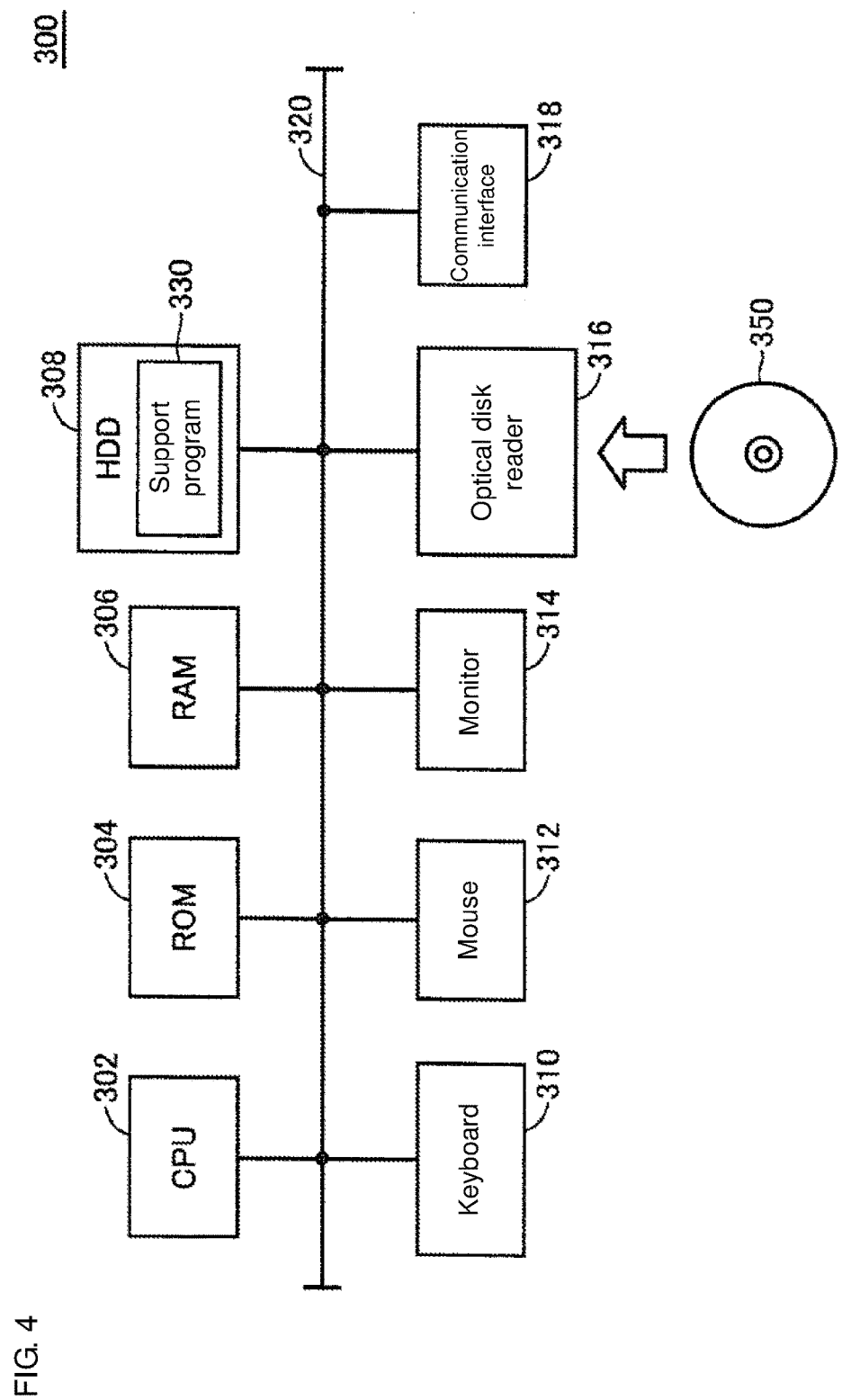
FIG. 4 is a schematic diagram illustrating a hardware configuration of a support device connected to the PLC of the embodiment.

FIG. 4 is a schematic diagram illustrating the hardware configuration of the support device 300 connected to the PLC 100 of the embodiment. Typically, the support device 300 is constructed with a general-purpose computer.

Referring to FIG. 4, the support device 300 includes a CPU 302 that executes various programs including the OS, a read only memory (ROM) 304 in which BIOS and various pieces of data are stored, a RAM 306 that provides a work area where data necessary for the program executed with the CPU 302 is stored, and a hard disk drive (HDD) 308 in which the program executed with the CPU 302 is stored in a nonvolatile manner. More specifically, a support program 330 that implements the function provided by the support device 300 is stored in the hard disk drive 308. Alternatively, a solid-state device (SSD) may be used instead of the hard disk drive 308.

The support device 300 also includes a keyboard 310 that receives user's operation, a mouse 312, and a monitor 314 that presents information to the user. The support device 300 also includes a communication interface (IF) 318 that is used to conduct communication with the PLC 100 (CPU unit 104).

The support program 330 executed with the support device 300 is distributed while stored in an optical recording medium 350. The program stored in the optical recording medium 350 is read with an optical disk reader 316, and stored in the hard disk drive 308. Alternatively, the support program 330 may be downloaded from a higher-level host computer through a network.

<E. User Program Producing Function>

A user program producing function provided by the support device 300 of the embodiment will be described below.

(e1: Outline)

The control system of the embodiment is configured to be able to group the plural devices (control target devices) each of which exchanges the data with the PLC 100 (CPU unit 104). As used herein, the "device" means the function unit 106 that exchanges the data with the CPU unit 104 of the PLC 100 through the PLC system bus 108, various field devices, and the remote IO device 200 (function unit 204) connected to the PLC 100 through the field bus 110.

In the embodiment, the PLC 100 can control the devices in units of groups by grouping the plural devices. The support device 300 of the embodiment provides a user interface that groups the plural devices.

Figure 5:
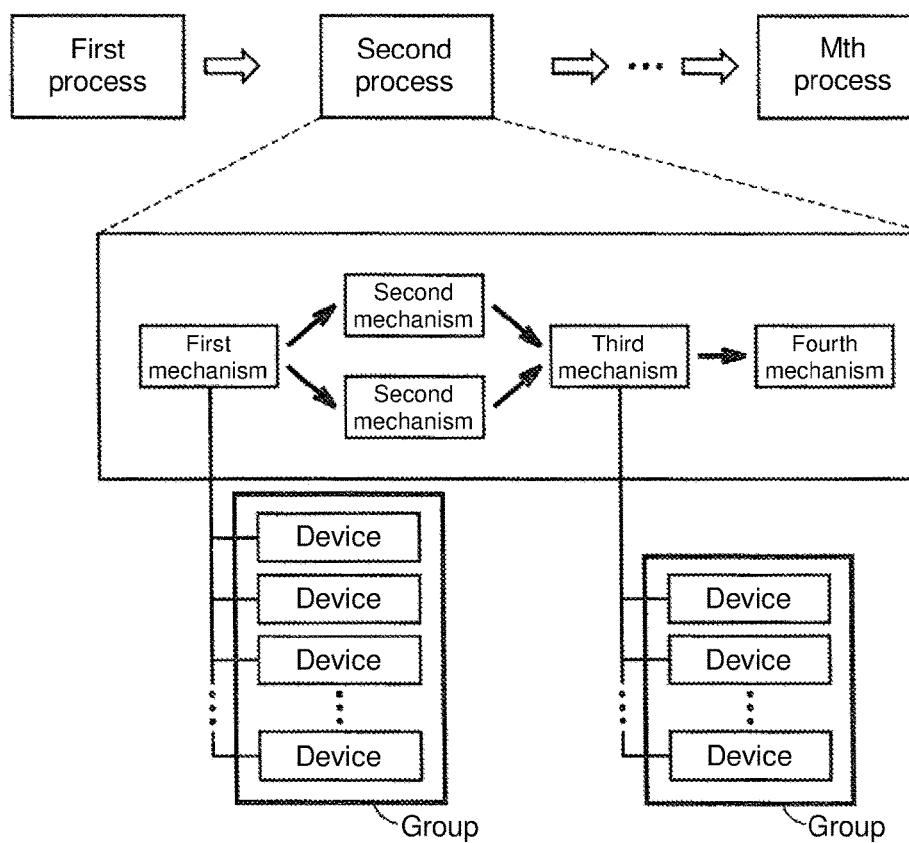
FIG. 5 is a view illustrating a concept of a grouping function in the control system of the embodiment.

FIG. 5 is a view illustrating a concept of a grouping function in the control system of the embodiment.

Referring to FIG. 5, it is assumed that the control system of the embodiment is aimed at the control of the production line including plural processes. Each of the plural processes is constructed with one or plural mechanisms. The mechanism includes a machine and a facility, which are used in the production line. For example, a second process is constructed with a first mechanism, a second mechanism, a third mechanism, and a fourth mechanism. The first mechanism, the second mechanism, the third mechanism, and the fourth function are sequentially operated to perform the second process. In each of the first to fourth mechanisms, plural mechanisms having the identical configuration can concurrently be operated. In the case that the single mechanism has an insufficient production capability, the production capability of the whole production line can be maintained by operating plural identical mechanisms in parallel.

One or plural devices are used in order to control the operation of each of the first to fourth mechanisms. FIG. 5 representatively illustrates each device used in the first and third mechanisms. The device includes the function unit 106 of the PLC 100, the function unit 204 of the remote IO device 200, and various field devices (such as the actuator and the sensor) provided according to the first mechanism. Each device is connected to the PLC 100 (CPU unit 104) through the bus. The PLC 100 exchanges the data with the plural devices.

In each of the first to fourth mechanisms, the corresponding one or plural devices are operated as expected (that is, as designed), thereby performing the operation of the mechanism. The occurrence of an abnormality of communication with the PLC 100 or the occurrence of an abnormality such as a malfunction of the hardware or software in the device can be cited as an example of a factor (abnormal factor) in which the device cannot be operated as designed. Generally, the temporary abnormality of the communication corresponds to a slight abnormality in which the operation of the mechanism can be continued, and the malfunction of the device corresponds to a serious abnormality in which the operation of the mechanism can hard to be continued.

However, sometimes even the slight abnormality should be dealt with as the serious malfunction according to the mechanism. For example, in a temperature monitoring device that monitors temperature of the object on the basis of values input from the plural devices, because monitoring performance is hard to be maintained when the communication abnormality occurs in one device, the operation of the mechanism cannot be performed. Accordingly, the communication abnormality is dealt with as the serious malfunction in the temperature monitoring device. Thus, a criterion for the serious abnormality depends on the mechanism.

In the case that the serious abnormality occurs in the device used in the mechanism, because the operation of the mechanism is hard to be performed, it is necessary to stop the actions of all the devices used in the mechanism. On the other hand, in the case that the slight abnormality occurs in the device used in the mechanism, the operation of the mechanism can be operated by the action of a remaining device used in the mechanism. That is, a behavior that should be taken after the occurrence of the mechanism depends on an abnormal content of the device.

Sometimes the process including the mechanism is hard to be performed when the operation of the mechanism is stopped because of the serious malfunction of the device. In such cases, because the performance of the process is stopped, it is necessary to avoid a secondary malfunction by stopping the operation of the process on an upstream side of the process. On the other hand, for the process on a downstream side, it is necessary to continue the operation for a given time in order to complete a currently-produced product. However, in the configuration in which plural mechanisms are concurrently operated like the second mechanism in FIG. 5, sometimes the process can continuously be performed by the operation of another mechanism even if the operation of one of the plural mechanisms is stopped.

In the case that the abnormality occurs in one of the plural devices used in the control system of the production line, it is assumed that plural pieces of control processing should be performed with the PLC 100 according to the abnormal content (the slight abnormality or the serious abnormality) of the device or an attribute (the mechanism and process in which the device is used) of the device in which the abnormality occurs. When the number of processes and/or the number of mechanisms constituting each process is increased by the large-scale production line, the production line has a large number of devices used, and the control processing becomes more complicated.

In the conventional application, it is necessary to produce the user program such that various pieces of control processing are incorporated in consideration of the abnormal content of the device or the attribute of the device. Therefore, the increased number of devices used in the control system results in a problem in that a degree of difficulty becomes significantly higher in the design of the user program.

In the embodiment, the plural devices used in the control system are grouped. This enables the design of the user program with the group as one control unit and the performance of the control processing with the group in the PLC 100 as one control unit.

Specifically, the support device 300 provides the interface that groups the plural devices used in the control system. The user can set one or plural devices used in one mechanism to one group, for example, as illustrated in FIG. 5. Otherwise, the user can set one or plural devices used in one process to one group. That is, the user can arbitrarily set the group according to the control purpose (for example, the target production line or process).

Thus, in the support device 300, each of the plural groups can be defined using the variable by grouping the plural devices. Therefore, the user can produce the user program using the variable indicating the group.

Specifically, in the case that one or plural devices used in one mechanism (or process) are set to one group, the processing aimed at the device used in the mechanism (or process) can be programmed using the "variable indicating the group". Group information referred to by the variable is configured to be properly updated according to the configuration of the control system set by the user. That is, the support device 300 successively updates a correspondence between the "variable indicating the group" and the group information referred to using the variable.

When the user program is produced using the variable specifying the group, the necessity to change the user program is eliminated even if the device used in the mechanism (or process) corresponding to the group is changed.

In the case that some of the target mechanisms (or processes) are common to the plural control systems, the common portion is easily diverted from the user program of another control system during the design of the user program. This enables efficiency of design work of the user program, which allows simplification of development of the PLC 100.

(e2: Processing Procedure and User Interface)

A detailed processing procedure of the user program producing function provided by the support device 300 will be described below.

The support device 300 compiles the user program designed arbitrarily by the user using the group information and the variable table, thereby producing the executable user program. The group information includes constitution information (hereinafter, also referred to as "group constitution information") about the group, information (hereinafter, also referred to as "group behavior information") about the behavior that should be taken as the group during the occurrence of the abnormality in the device belonging to the group, and information (hereinafter, also referred to as "group dependence information") about a dependence relationship in which the action of the own group is controlled according to the action of another group. The user can arbitrarily set the group information using the user interface that groups the plural devices provided by the support device 300.

(e2.1 Group Constitution Information)

Figure 6:
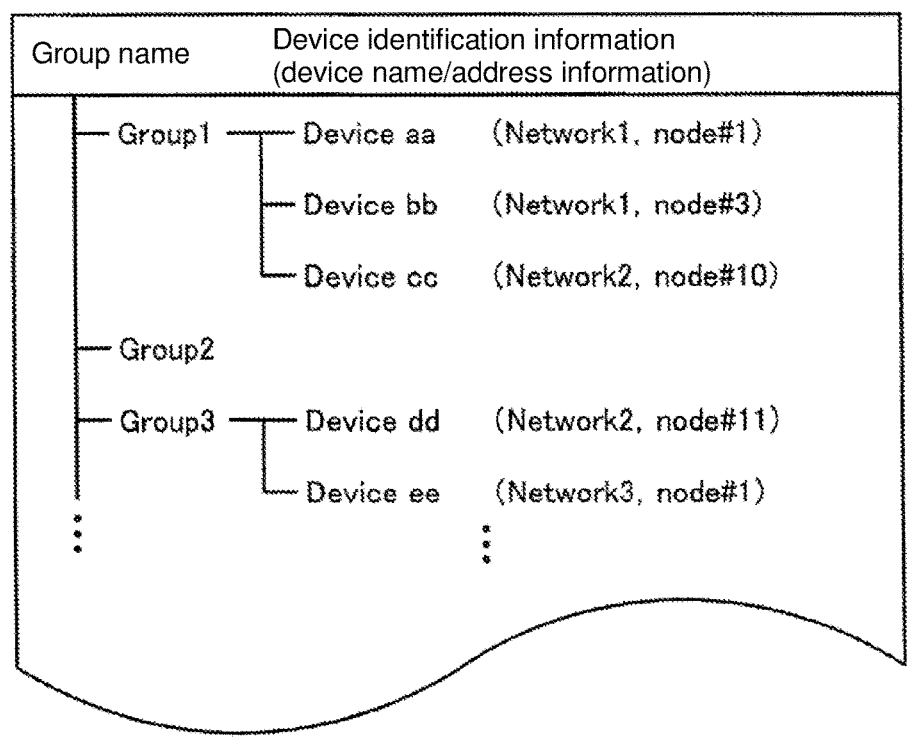
FIG. 6 is a schematic diagram illustrating group constitution information set to the support device of the embodiment.

FIG. 6 is a schematic diagram illustrating the group constitution information set to the support device 300. The group constitution information includes information indicating a group name with respect to each group and identification information (hereinafter, also referred to as "device identification information") specifying the device belonging to the group. The device identification information includes information indicating a device name and address information specifying the device. The address information is constructed with a network address indicating the network connected to the device and a node address specifying the device on the network.

In the example of FIG. 6, the device having a device name "Device aa", the device having a device name "Device bb", and the device having a device name "Device cc" belong to the group having a group name "Group1". In the three devices, the device having the device name "Device aa" has the network address of "Network1" and the node address of "node #1".

The user can arbitrarily set the device belonging to each group on a user interface screen that sets the group provided by the support device 300. Specifically, the user selects the device belonging to each group from a device list by an input operation to the user interface screen, and inputs the necessary setting value. Specifically, the user sets at least the group name, the device name, the network address, and the node address.

(e2.2 Group Behavior Information)

FIG. 7 is a view illustrating the group behavior information set to the support device 300.

Referring to FIG. 7, the group behavior information includes information about the behavior of the device in which the abnormality occurs, information about the behavior of a remaining device of the group to which the device in which the abnormality occurs belongs, and information about a condition that restores the group from the abnormal state. Hereinafter, the device in which the abnormality occurs is referred to as an "abnormal device", and the group to which the abnormal device belongs is referred to as an "abnormal group".

The user can select one of "operation stop", "shrinking operation", and "continuation operation" as the behavior of the abnormal group according to the abnormal contents of the device and the like. The operation stop means that the operations of the abnormal device and remaining device of the abnormal group are stopped. That is, the operation stop indicates that the operations of all the devices belonging to the abnormal group are stopped. For example, in the configuration in which the plural devices used in one mechanism are set to one group, the operation stop is selected as the behavior of the abnormal group when the serious abnormality occurs in one of the plural devices. As to the condition that the group is restored from the operation stop, that the abnormal factor is canceled from the outside of the mechanism is clearly indicated after an abnormal factor is removed from the abnormal device.

The shrinking operation means that the operation of the remaining device of the abnormal group is continued while the operation of the abnormal device is stopped. For example, in the configuration in which the plural devices used in one mechanism are set to one group, the shrinking operation is selected as the behavior of the mechanism of the abnormal group when the slight abnormality occurs in one of the plural devices. As to the condition that the group is restored from the shrinking operation, a predetermined abnormality canceling condition is established after the abnormal factor is removed from the abnormal device. For example, like a reset operation of the user, that the abnormal factor is canceled from the outside of the mechanism is clearly indicated as the abnormality canceling condition.

Similarly to the shrinking operation, the continuation operation means that the operation of the remaining device of the abnormal group is continued while the operation of the abnormal device is temporarily stopped. The continuation operation differs from the shrinking operation in the restoration condition. The automatic restoration after the removal of the abnormal factor from the abnormal device is decided as the condition that the group is restored from the continuation operation.

As described above, in both the shrinking operation and the continuation operation, the remaining device of the abnormal group is continuously operated even after the abnormality occurs in the device. Which one of the shrinking operation and the continuation operation is selected can be decided according to the function of the mechanism (or process) constituting the abnormal group or the abnormal content of the abnormal device. For example, in the case that the abnormal group is a safety mechanism that stops the operation of the facility when a worker enters a predetermined area of the production line, the operation of the facility should not be restored until the user checks the removal of dangerous source to perform the reset operation. Accordingly, the shrinking operation is selected as the behavior of the abnormal group.

On the other hand, in the case that the abnormal content is a temporal communication abnormality, the automatic restoration can be performed without waiting for user's reset operation when the communication returns to normal. Accordingly, the continuation operation is selected as the behavior of the abnormal group.

FIG. 8 is a schematic diagram illustrating the group behavior information set to the support device 300.

Referring to FIG. 8, the group behavior information includes information indicating the group name with respect to each group and the information indicating the behavior of the group. In the example of FIG. 8, the behavior that should be taken by the group having the group name "Group1" is "Fail-soft Operation (shrinking operation)" when the abnormality occurs in the device belonging to the group.

The user can arbitrarily set the behavior of each group on the user interface screen that sets the group provided by the support device 300. Specifically, the user can select one of "Fail-soft Operation", "Stop" (operation stop), "Continuous Operation" (continuation operation) by performing the input operation to the user interface screen.

(e2.3 Group Dependence Information)

FIGS. 9 and 10 are views illustrating the group dependence information set to the support device 300. In FIGS. 9 and 10, it is assumed that one or plural devices used in one mechanism are set to one group.

Referring to FIG. 9, the first to fifth mechanisms constitute one process of the production line. The first mechanism, the second mechanism, the third mechanism, the fourth function, and the fifth mechanism are sequentially operated to perform one process.

The device used in the first mechanism belongs to the group having the group name "Group1", and the device used in the second mechanism belongs to the group having the group name "Group2". For the fourth mechanism in which the device is not used, there is no device belonging to the group having the group name "Group4".

As described above, in the case that the serious abnormality occurs in the device belonging to a certain group, the operations of all the devices belonging to the abnormal group are stopped as the behavior of the abnormal group. In order to minimize a damage caused by the abnormality of the device, it is necessary to stop the operation of the group on the upstream side of the abnormal group in association with the operation stop of the abnormal group. On the other hand, sometimes the operation of the group on the downstream side of the abnormal group is preferably continued in order to complete the currently-produced product. Thus, among the groups, there is a dependence relationship that the operation state (operation stop/operation continuation) of the own group depends on the operation state of another group.

FIG. 10 is a table illustrating an example of the dependence relationship among the groups. FIG. 10 illustrates the dependence relationship when one of two groups arbitrarily selected from the plural groups is set to a "master group" while the other is set to a "slave group".

Referring to FIG. 10, the case that the operation of the slave group is stopped when the operation of the master group is stopped is defined as "dependence". On the other hand, the case that the operation of the slave group is continued even if the operation of the master group is stopped is defined as "independence".

In FIG. 10, when the operation of the group having the group name "Group1" is stopped, the groups (group names of "Group2", "Group3", and "Group") on the downstream side of "Group1" can be continued. On the other hand, when the operation of the group having the group name "Group2" is stopped, it is necessary to stop the operation of the group (group name "Group1") on the upstream side of "Group2", and the operations of the group (group name "Group3") parallel to "Group2" and the group (group name "Group4") on the downstream side of "Group2" can be continued.

Figures 11, 12:
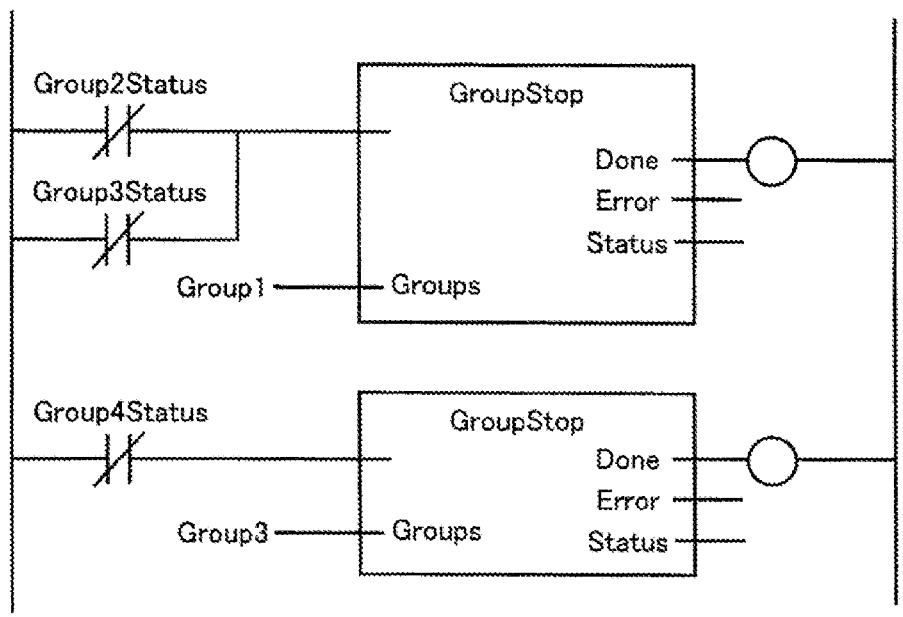
FIG. 11 is a view illustrating the group dependence information set to the support device of the embodiment.
FIG. 12 is a view illustrating an example of a user program produced with the support device of the embodiment.

FIG. 11 is a view illustrating the group dependence information set to the support device 300.

Referring to FIG. 11, the group dependence information includes information specifying another group whose operation should be stopped according to the stop of the operation of the own group, with respect to each group. In the example of FIG. 11, there is no other group ("None") whose operation should be stopped when the operation of the group having the group name "Group1" is stopped. The operation of the group having the group name "Group1" should be stopped when the operation of the group having the group name "Group2" is stopped.

On the user interface screen that sets the group provided by the support device 300, the user can set another group whose operation should be stopped in each group on the basis of the dependence relationship among the groups in FIG. 10. Specifically, the user can set "None" or the group name of another group whose operation should be stopped by performing the input operation to the user interface screen.

(e.2.4 Processing Procedure)

The group information (the group constitution information, the group behavior information, and the group dependence information) is set by the above procedure. The group information set by the user on the user interface screen is stored in the hard disk drive 308 of the support device 300, and stored in the nonvolatile memory 128 (FIG. 2) of the CPU unit 104 of the PLC 100.

In the user program, the target group can be specified using the group set in the group constitution information as the variable. That is, the support device 300 provides the user interface that can produce the user program using the variable indicating the group.

The support device 300 dynamically produces and updates a variable table on the basis of the group constitution information. When the user produces the group constitution information, the variable table defining the correspondence between the variables used in the user program is automatically produced and updated. More specifically, when a request to compile the user program is made, the support device 300 produces and updates the variable table on the basis of the group constitution information, and produces the executable user program.

At this point, in the embodiment, because the user program can be produced using the variable specifying the group, the user can program the dependence relationship among the groups in FIG. 10. Therefore, the PLC 100 executes a predetermined command included in the user program, which allows the action of each group to be controlled and monitored according to the dependence relationship among the groups.

FIG. 12 is a view illustrating an example of the user program produced with the support device 300. Referring to FIG. 12, the dependence relationship among the groups in FIG. 10 is partially programmed. Particularly, the operation state of the group having the group name "Group1" is substituted from a variable "Group1Status". In a process of producing the user program, the support device 300 produces an object with respect to the variable "Group1Status". In the object, the device name ("Device aa", "Device bb", and "Device cc") of the device belonging to the group having the group name "Group1" in the group constitution information (FIG. 6) is set to an initial value. That is, the controller (support device 300/CPU unit 104) sets "Device aa", "Device bb", and "Device cc" to the variable "Group1Status".

A function block "GroupStop" indicates a command to stop the operation of the group. The group name of the group whose operation should be stopped is input to an argument "Groups". The function block "GroupStop" on the upper side of FIG. 12 expresses the command that the operation of the group having the group name "Group1" is stopped when one of the group having the group name "Group2" and the group having the group name "Group3" is in the state of the operation stop. The function block "GroupStop" on the lower side of FIG. 12 expresses the command that the operation of the group having the group name "Group3" is stopped when the group having the group name "Group4" is in the state of the operation stop.

In the function block "GroupStop", the group input to the argument "Groups" can be set on the basis of the dependence relationship among the groups in FIG. 10. The controller (support device 300/CPU unit 104) sets the variables "Group1" and "Group3" on the basis of the group constitution information. For example, the controller sets device names "Device dd" and "Device cc" of the devices belonging to the group name "Group3" in the group constitution information to an initial value with respect to the variable "Group3".

Thus, in compiling the user program, the support device 300 searches the group having the same name as the assigned variable with respect to each variable, and internally sets the device belonging to the searched group to the initial value of the variable. That is, the support device 300 provides an environment in which the user program can be produced using the variable indicating the group. When the user program is produced using the variable specifying a certain group, the necessity to change the user program is eliminated even if the configuration of the group is changed, namely, even if the device belonging to the group is changed.

When producing the executable user program from a source program produced with the variable, the support device 300 transmits the produced user program to the PLC 100 (CPU unit 104).

The temporarily-designed device configuration of the group is sometimes changed. In such cases, basically it is only necessary for the user to change the group constitution information to compile the group constitution information again, but it is not necessary for the user to change the user program. The support device 300 updates the variable table by referring to the group constitution information, and produces an executable user program (object program) suitable for a new system configuration from the user program according to the updated variable table.

<F. Device Control of PLC 100>

The control performed on the plural devices with the PLC 100 (CPU unit 104) will be described below. The device control of the CPU unit 104 is performed using the user program produced with the variable indicating the group and the group information 185 stored in the nonvolatile memory 128. As described below, the CPU unit 104 controls the actions of the abnormal device and abnormal group on the basis of the group constitution information and the group behavior information. The CPU unit 104 also controls the operation of another group except for the abnormal group on the basis of the group dependence information.

As to the control of the action of another group, as illustrated in FIG. 12, the CPU unit 104 can perform the control based on the command included in the user program by programming the dependence relationship among the groups instead of the control based on the group dependence information.

Figure 13:
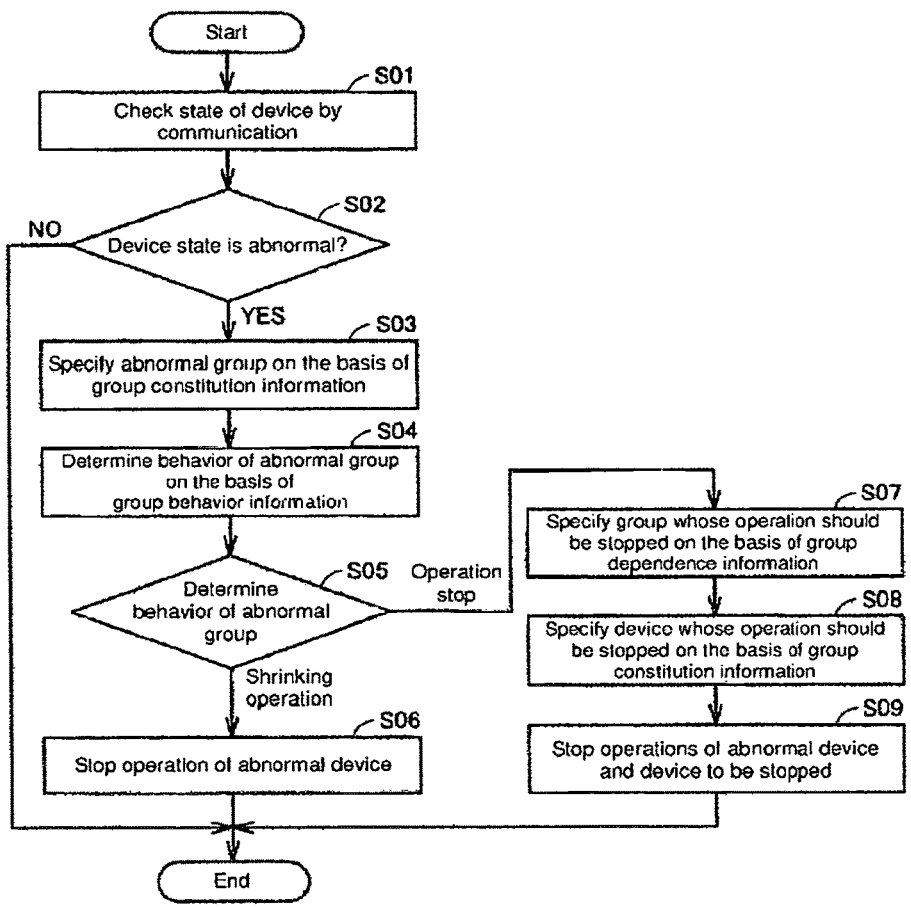
FIG. 13 is a flowchart illustrating a processing procedure of device control performed with the PLC of the embodiment.
Figure 14:
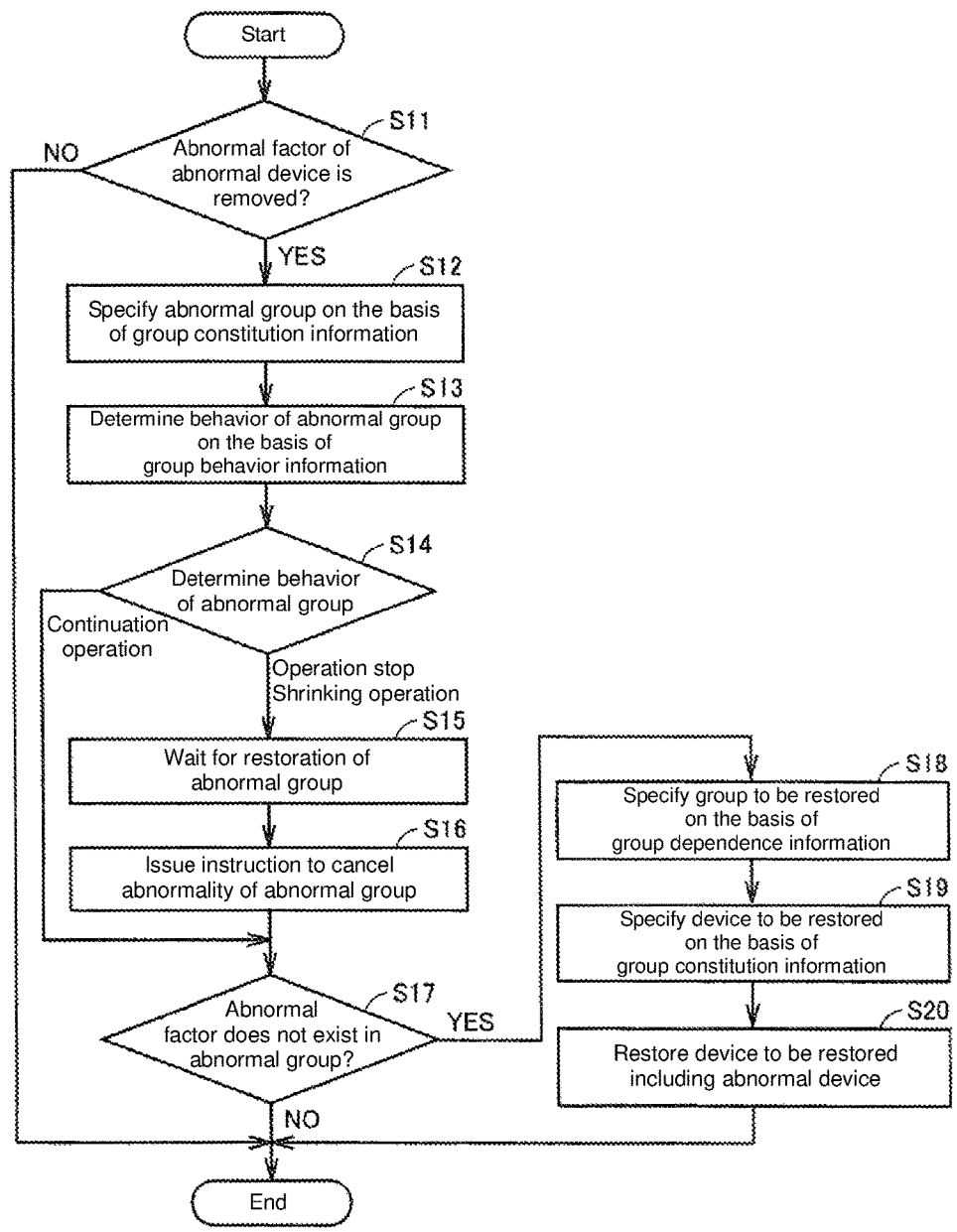
FIG. 14 is a flowchart illustrating the processing procedure of the device control performed with the PLC of the embodiment.

FIGS. 13 and 14 are flowcharts illustrating a processing procedure of the device control performed with the PLC 100 (CPU unit 104).

Referring to FIG. 13, the CPU unit 104 exchanges the data with plural devices (the mechanism unit 106, various field devices, and the remote IO device 200) during the performance of the user program. The CPU unit 104 checks the state of each device on the basis of the data exchanged with the plural devices (step S01). The CPU unit 104 determines whether the abnormality occurs in the device on the basis of the state of the device (step S02). When the abnormality does not occur in the plural devices (NO in step S02), the CPU unit 104 ends the processing associated with the device control.

On the other hand, when determining that the abnormality occur in one of the plural devices (YES in step S02), the CPU unit 104 specifies the group (abnormal group) to which the device (abnormal device), in which the abnormality occurs, belongs by referring to the group constitution information (FIG. 6) (step S03).

Then, the CPU unit 104 determines the behavior of the abnormal group by referring to the group behavior information (FIG. 8) (step S04). Specifically, the CPU unit 104 selects one of the operation stop, the shrinking operation, and the continuation operation as the behavior of the abnormal group on the basis of the group behavior information (step S05).

When the shrinking operation or the continuation operation is selected as the behavior of the abnormal group, the CPU unit 104 continues the operation of the remaining device belonging to the abnormal group while stopping the operation of the abnormal device (step S06).

On the other hand, when the operation stop is selected as the behavior of the abnormal group, the CPU unit 104 refers to the group dependence information (FIG. 11) to specify another group whose operation should be stopped in association with the operation stop of the abnormal device (step S07). When the group whose operation should be stopped does not exist, the CPU unit 104 stops only the operation of the abnormal device. In this case, as illustrated in FIG. 14, the abnormal device waits for the restoration until the abnormal factor is removed after the stop of the operation, or until the cancellation of the abnormality is clearly indicated after the stop of the operation.

When specifying another group whose operation should be stopped, the CPU 104 refers to the group constitution information to specify the device belonging to another group (step S08). The specified device corresponds to the device whose operation should be stopped in association with the operation stop of the abnormal group (abnormal device). That is, the device whose operation should be stopped includes the remaining device belonging to the abnormal group and the device belonging to another group whose operation should be stopped.

The CPU unit 104 stops the operations of the abnormal device and the device whose operation should be stopped (step S09). As illustrated in FIG. 14, these devices wait for the restoration until the cancellation of the abnormality is clearly indicated after the stop of the operation.

Referring to FIG. 14, the CPU unit 104 determines whether the restoration condition is established with respect to the device whose operation is stopped. Specifically, the CPU unit 104 initially determines whether the abnormal factor is removed from the abnormal device (step S11). When the abnormal factor is not removed from the abnormal device (NO in step S11), the CPU unit 104 does not go to the restoration processing, but continues to maintain the device whose operation is stopped at the restoration waiting state.

On the other hand, when determining that the abnormal factor is removed from the abnormal device (YES in step S11), the CPU unit 104 refers to the group constitution information to specify the abnormal group (step S11). Then, the CPU unit 104 determines the behavior of the abnormal group by referring to the group behavior information (step S13). Specifically, the CPU unit 104 determines which one of the operation stop, the shrinking operation, and the continuation operation is selected as the behavior of the abnormal group on the basis of the group behavior information (step S14).

When the operation stop or the shrinking operation is selected as the behavior of the abnormal group, the CPU unit 104 puts the device, which belongs to the abnormal group while the operation of the device is stopped, into the restoration waiting state (S15). At this point, when an instruction to cancel the abnormality is issued by user's reset operation (step S16), the CPU unit 104 determines whether the abnormal factor does not exist in each of the devices belonging to the abnormal group (step S17). There is considered to be a possibility that a new abnormal factor occurs in the device except for the abnormal device while the abnormal group is in the restoration waiting state. When the abnormal factor exists in another device of the abnormal group (NO in step S17), the CPU unit 104 does not go to the restoration processing, but continues to maintain the device whose operation is stopped at the restoration waiting state.

On the other hand, when the abnormal factor does not exist in another device of the abnormal group (YES in step S17), the CPU unit 104 refers to the group dependence information to specify another group that should be restored in association with the restoration of the abnormal group (step S18). At this point, another group that should be restored corresponds to the group, which is specified as the group whose operation should be stopped through the processing in step S07 of FIG. 13. When the behavior of the abnormal group is the shrinking operation, another group to be restored does not exist, but only the abnormal group becomes the group to be restored.

When the group to be restored is specified, the CPU unit 104 refers to the group constitution information to specify the device to be restored (step S19). When the behavior of the abnormal group is the shrinking operation, the device to be restored is only the abnormal device. When the behavior of the abnormal group is the operation stop, the device to be restored includes the abnormal device, another device of the abnormal group, and the device whose operation should be stopped, the device whose operation should be stopped being specified through the processing in step S08 of FIG. 13.

Finally, the CPU unit 104 restores the device to be restored from the operation stop together with the abnormal device (step S20).

<G. Advantages>

In the embodiment, the plural devices that exchange the data with the control device are grouped to provide the programming environment in which the user program is produced with the variable specifying the group. Therefore, the user program can efficiently be produced even if a large number of devices are used by speed enhancement and expansion in scale of the control system.

Even if the device belonging to the group is changed by the change of the control system after the user program is produced, it is not necessary to change a source code of the user program in association with the change of the device. Therefore, the change of the system configuration can flexibly be dealt with.

In the embodiment, the plural devices used in one mechanism (or process) are collected into one group. Therefore, in the case that some mechanisms (or processes) are common to the plural control system, the common portion is easily diverted from the user program of another control system. This enables the efficiency of the design work of the user program. As a result, the development of the control device can be simplified even if the number of devices increases.

In the control device, which one of the plural devices is used in the mechanism of the process can be specified by referring to the group information set by the user. Therefore, a fail-safe function or an interlock function can easily be implemented in the case that the abnormality occurs in one of the plural devices.

In the embodiment, the configuration in which the plural devices used in one mechanism (or process) are collected into one group is described as the method for grouping the plural devices. However, the grouping method is not limited to the configuration of the embodiment. As used herein, the grouping means that the plural devices configured to unitedly implement one function are collected into one group, and therefore the plural devices can be dealt with as a module that implements the function. Accordingly, the user (such as a developer) can freely set how to group the plural devices.

In the embodiment, the plural groups can be allocated to plural tasks including the user program. Particularly, the PLC 100 periodically executes the user program according to a cycle time. The PLC 100 stores the data exchanged with the plural devices therein while sequentially executing the command indicated in the user program. The pieces of data stored in the PLC 100 are collectively exchanged for external data of the PLC 100 according to the cycle time. In the embodiment, each of the plural groups is allocated to the task on the basis of a priority of the task executed with the PLC 100. Because the task is decided in each group, the acquisition of the input data and the transmission of the output data are controlled between the PLC 100 and the group according to the cycle time of each task. That is, a period of the data exchange can be controlled in units of groups.

The cycle time of the task can vary according to the priority of the task. For example, the cycle time of the task having the higher priority is set shorter than the task having the lower priority. Therefore, in the task having the higher priority, it is necessary to exchange the data in a shorter period. In the embodiment, because the data exchange period can be controlled in each group, the data exchange can easily be performed according to the priority of the task.

In the embodiment, timing of inputting and outputting the data to and from the device can be controlled in units of groups. Therefore, the timing of inputting and outputting the data can easily be synchronized among the plural devices belonging to one group, or the timing of inputting and outputting the data can easily be synchronized among some of the plural devices. As a result, because producing the program controlling one mechanism is facilitated, the user program or the control target device is easily diverted when the similar or identical mechanism is developed in another control system.

In the configuration of the embodiment, the group constitution information, the group behavior information, and the group dependence information are set as the group information. Alternatively, the group constitution information and the group behavior information may be set. Alternatively, the dependence relationship among the groups may be programmed in the user program while the group constitution information and the group behavior information are set. Alternatively, the dependence relationship among the groups may be programmed in the user program while the group constitution information, the group behavior information, and the group dependence information are set. The user (developer) can select one of the four configurations according to the configuration of the control system to be implemented.

The disclosed embodiment is illustrative only, not restrictive in all respects. The scope of the present invention is indicated by not the above description but the claims, and the meanings equivalent to the claims and all the changes within the claims are included in the present invention.

DESCRIPTION OF SYMBOLS

1: control system
10: detection switch
20: relay
100: PLC
102: power supply unit
104: CPU unit
106, 204: function unit
108: PLC system bus
110: field bus
114: communication cable
120: processor
122: chip set
124: system clock
126: main memory
128: nonvolatile memory
130: USB connector
140: PLC system bus controller
142, 152: buffer memory
144: PLC system bus control circuit
146, 156: DMA control circuit
148: PLC system bus connector
150: field bus controller
154: field bus control circuit
158: field bus connector
160: higher-level communication controller
170: memory card interface
172: memory card
180: OS
182: data definition information
184: operation log
185: group information
186: user program
188: system program
190: sequence command program
192: access processing program
194: input and output processing program
196: tool interface program
198: scheduler
200: remote IO device
202: communication coupler
300: support device
302: CPU
304: ROM
306: RAM
308: hard disk drive
310: keyboard
312: mouse
314: monitor
316: optical disk reader
318: communication interface
330: support program
350: optical recording medium

The invention claimed is:

1. A control device that controls operations of a plurality of control target devices by exchanging data with the plurality of control target devices, each of at least some of the plurality of control target devices being classified so as to belong to one of a plurality of groups, each of the plurality of groups comprising at least one of the plurality of control target devices, the control device comprising a processor configured with a program to perform operations comprising:
- operation as a section configured to detect an abnormality of each of the plurality of control target devices based on data exchanged with the plurality of control target devices in executing a user program associated with operations of the plurality of control target devices;
- operation as a section configured to store:
  - identification information, the identification information specifying, for each of the plurality of groups, one or more control target devices belonging to the group, and
  - behavior information, the behavior information specifying, for each of the plurality of groups, a behavior of the group when the abnormality is detected in one of the one or more control target devices belonging to the group;
- operation as a section configured to specify an abnormal group based on the identification information when the abnormality is detected, the abnormal group being a group to which the control target device in which the abnormality is detected belongs; and
- operation as a section configured to control action of the abnormal group based on the behavior information.

2. The control device according to claim 1, wherein processor is configured with the program to perform operations such that the section configured to control the action of the abnormal group selects one of:
- a first action comprising stopping all the control target devices belonging to the abnormal group,
- a second action comprising stopping the operation of the control target device in which the abnormality is detected, and continuing the operation of control target devices other than the control target device in which the abnormality is detected that are members of the abnormal group until a predetermined abnormality canceling condition is established in the control device after an abnormal factor is removed, and
- a third action comprising temporarily stopping the operation of the control target device in which the abnormality is detected until the abnormal factor is removed, and continuing the operation of the control target devices other than the control target device in which the abnormality is detected that are members of the abnormal group.

3. The control device according to claim 1, the processor is configured with the program to perform operations further comprising:
- operation as a section configured to store information about a dependence relationship controlling action of one group according to action of another group with respect to each of the plurality of groups; and
- operation as a section configured to control action of groups other than the abnormal group according to the action of the abnormal group by referring to the information about the dependence relationship.

4. The control device according to claim 1, the processor is configured with the program to perform operations further comprising:
- operation as a section configured to control action of groups other than the abnormal group according to the action of the abnormal group by executing the user program, wherein
- the user program is configured to be able to program a dependence relationship controlling action of one group according to action of another group with respect to each of the plurality of groups.

5. The control device according to claim 3, wherein processor is configured with the program to perform operations such that the section configured to control the action of the remaining control group stops or continues the operation of the groups other than the abnormal group when the operation of the abnormal group stops.

6. The control device according to claim 1, the processor is configured with the program to perform operations further comprising operation as a section configured to allocate the plurality of groups to a plurality of tasks including the user program.

7. The control device according to claim 1, the processor is configured with the program to perform operations further comprising operation as a section configured to control timing of inputting and outputting a signal in each of the plurality of control target devices in units of groups.

* * * * *